(12) United States Patent
Jones et al.

(10) Patent No.: US 7,617,451 B2
(45) Date of Patent: *Nov. 10, 2009

(54) STRUCTURING DATA FOR WORD PROCESSING DOCUMENTS

(75) Inventors: Brian Jones, Redmond, WA (US);
Robert Little, Redmond, WA (US);
Andrew Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/398,339

(22) Filed: Apr. 5, 2006

(65) Prior Publication Data

US 2006/0190815 A1 Aug. 24, 2006

Related U.S. Application Data

(63) Continuation-in-part of application No. 11/018,718, filed on Dec. 20, 2004.

(60) Provisional application No. 60/687,261, filed on Jun. 3, 2005, provisional application No. 60/716,805, filed on Sep. 13, 2005.

(51) Int. Cl.
*G06F 17/27* (2006.01)
*G06F 17/21* (2006.01)

(52) U.S. Cl. .................. 715/272; 715/200; 715/209; 715/229; 715/234

(58) Field of Classification Search .......... 715/500, 715/511, 513, 515, 200, 209, 229, 234, 272
See application file for complete search history.

(56) References Cited

U.S. PATENT DOCUMENTS 4,410,286 A 10/1983 Ko et al.
4,594,674 A 6/1986 Boulia et al.

(Continued)

FOREIGN PATENT DOCUMENTS

EP 1 376 387 A2 1/2004

(Continued)

OTHER PUBLICATIONS

Brauer et al., Open Office Specification, Mar. 22, 2004, Edition 1.0, <http://www.oasis-open.org/committees/download.php/6037/office-spec-1.0-cd-1.pdf>.*

(Continued)

*Primary Examiner*—Joshua D Campbell
(74) *Attorney, Agent, or Firm*—Merchant & Gould P.C.

(57) ABSTRACT

An open file format is used to structure the features and data within a document associated with a word processing application. The file format simplifies the way a word processing application organizes document features and data, and presents a logical model that is easily accessible. The file format is made up of a collection of modular parts that are stored within a container. The content included in the modular parts are XML that is based on ASCII. The XML schema provides a definitional framework for how the modular parts relate. This content allows tools to interrogate a word processing document to examine and utilize content and ensure that the file is written correctly. Each of the modular parts is capable of being interrogated separately regardless of whether the application that created the document is running. Information may also be changed, added, and deleted from each of the modular parts.

19 Claims, 8 Drawing Sheets

U.S. PATENT DOCUMENTS

| | | | |
|---|---|---|---|
| 4,649,513 A | 3/1987 | Martin et al. | |
| 4,870,611 A | 9/1989 | Martin et al. | |
| 5,222,205 A | 6/1993 | Larson et al. | |
| 5,267,155 A | 11/1993 | Buchanan et al. | 715/540 |
| 5,469,533 A | 11/1995 | Dennis | |
| 5,487,138 A | 1/1996 | Rust et al. | |
| 5,537,526 A | 7/1996 | Anderson et al. | |
| 5,579,466 A | 11/1996 | Habib et al. | 715/529 |
| 5,579,519 A | 11/1996 | Pelletier | 717/139 |
| 5,613,124 A | 3/1997 | Atkinson et al. | |
| 5,655,130 A | 8/1997 | Dodge et al. | |
| 5,675,788 A | 10/1997 | Husick et al. | 707/104.1 |
| 5,701,342 A | 12/1997 | Anderson et al. | |
| 5,745,910 A | 4/1998 | Piersol et al. | |
| 5,752,055 A | 5/1998 | Redpath et al. | |
| 5,752,056 A | 5/1998 | Celik | |
| 5,819,295 A | 10/1998 | Nakagawa et al. | |
| 5,845,058 A | 12/1998 | Shaw et al. | |
| 5,893,109 A | 4/1999 | DeRose et al. | 707/104.1 |
| 5,903,903 A | 5/1999 | Kennedy | |
| 5,903,905 A | 5/1999 | Anderson et al. | 815/526 |
| 5,905,504 A | 5/1999 | Barkans et al. | |
| 5,911,776 A | 6/1999 | Guck | |
| 5,950,215 A | 9/1999 | Tabuchi | |
| 5,960,168 A | 9/1999 | Shaw et al. | |
| 5,993,088 A | 11/1999 | Nogay et al. | |
| 6,023,714 A | 2/2000 | Hill et al. | 715/513 |
| 6,026,416 A | 2/2000 | Kanerva et al. | |
| 6,067,531 A | 5/2000 | Hoyt et al. | 705/35 |
| 6,094,665 A | 7/2000 | Lyons et al. | |
| 6,134,552 A | 10/2000 | Fritz et al. | |
| 6,144,974 A | 11/2000 | Gartland | |
| 6,175,845 B1 | 1/2001 | Smith et al. | |
| 6,182,080 B1 * | 1/2001 | Clements | 707/102 |
| 6,182,096 B1 | 1/2001 | Mastie et al. | |
| 6,199,082 B1 | 3/2001 | Ferrel et al. | |
| 6,212,530 B1 | 4/2001 | Kadlec | |
| 6,247,018 B1 | 6/2001 | Rheaume | |
| 6,247,066 B1 | 6/2001 | Tanaka | |
| 6,269,403 B1 | 7/2001 | Anders et al. | |
| 6,342,904 B1 | 1/2002 | Vasudevan et al. | |
| 6,362,870 B2 | 3/2002 | Mui et al. | |
| 6,393,441 B1 | 5/2002 | Kanerva et al. | |
| 6,407,821 B1 | 6/2002 | Hohensee et al. | |
| 6,418,448 B1 | 7/2002 | Sarkar | |
| 6,449,653 B2 | 9/2002 | Klemets et al. | |
| 6,457,017 B2 | 9/2002 | Watkins et al. | |
| 6,480,206 B2 | 11/2002 | Prinzing | |
| 6,484,189 B1 | 11/2002 | Gerlach et al. | |
| 6,496,206 B1 | 12/2002 | Mernyk et al. | 715/835 |
| 6,507,856 B1 | 1/2003 | Chen et al. | |
| 6,509,974 B1 | 1/2003 | Hansen | |
| 6,538,760 B1 | 3/2003 | deBry et al. | |
| 6,549,918 B1 | 4/2003 | Probert, Jr. et al. | |
| 6,583,789 B1 | 6/2003 | Carlson et al. | |
| 6,591,278 B1 | 7/2003 | Ernst | |
| 6,604,144 B1 | 8/2003 | Anders | |
| 6,608,693 B1 | 8/2003 | Loyd et al. | |
| 6,609,200 B2 | 8/2003 | Anderson et al. | |
| 6,654,737 B1 | 11/2003 | Nunez | |
| 6,657,647 B1 | 12/2003 | Bright | |
| 6,658,477 B1 | 12/2003 | Lisitsa et al. | |
| 6,674,540 B1 | 1/2004 | Wiechers et al. | |
| 6,675,353 B1 | 1/2004 | Friedman | |
| 6,675,356 B1 | 1/2004 | Adler et al. | |
| 6,681,223 B1 | 1/2004 | Sundaresan | |
| 6,694,485 B1 | 2/2004 | Kelley et al. | |
| 6,715,126 B1 | 3/2004 | Chang et al. | |
| 6,763,343 B1 | 7/2004 | Brooke et al. | |
| 6,771,291 B1 | 8/2004 | DiStefano, III | |
| 6,781,609 B1 | 8/2004 | Barker et al. | |
| 6,785,673 B1 | 8/2004 | Fernandez | |
| 6,789,229 B1 | 9/2004 | Dunietz et al. | |
| 6,812,941 B1 | 11/2004 | Brown et al. | |
| 6,871,321 B2 | 3/2005 | Wakayama | |
| 6,910,843 B2 | 6/2005 | Saw et al. | |
| 6,912,555 B2 * | 6/2005 | Lemon et al. | 715/513 |
| 6,918,082 B1 | 7/2005 | Gross et al. | |
| 6,925,597 B2 | 8/2005 | Anwar | |
| 6,925,631 B2 | 8/2005 | Golden | |
| 6,931,590 B2 | 8/2005 | Kanie et al. | |
| 6,938,203 B1 | 8/2005 | Dimarco et al. | |
| 6,941,510 B1 | 9/2005 | Ozzie et al. | |
| 6,952,801 B2 | 10/2005 | Warmus et al. | |
| 6,961,902 B2 | 11/2005 | Anecki et al. | 715/500 |
| 6,981,207 B1 | 12/2005 | Bakman et al. | 715/500 |
| 6,993,527 B1 | 1/2006 | Raman et al. | |
| 7,036,076 B2 | 4/2006 | Anwar | |
| 7,051,276 B1 | 5/2006 | Mogilevsky et al. | |
| 7,054,841 B1 * | 5/2006 | Tenorio | 705/57 |
| 7,080,083 B2 | 7/2006 | Kim et al. | 707/100 |
| 7,134,071 B2 | 11/2006 | Ohwada et al. | |
| 7,168,035 B1 | 1/2007 | Bell et al. | |
| 7,171,618 B2 | 1/2007 | Harrington et al. | |
| 7,290,205 B2 | 10/2007 | Monocsko et al. | |
| 7,301,544 B2 | 11/2007 | Yuan | |
| 7,412,649 B2 | 8/2008 | Emek et al. | |
| 7,418,652 B2 | 8/2008 | Ornstein et al. | |
| 7,487,448 B2 | 2/2009 | Emerson et al. | |
| 7,549,118 B2 | 6/2009 | Shur et al. | |
| 2001/0003828 A1 | 6/2001 | Peterson et al. | |
| 2001/0013043 A1 | 8/2001 | Wagner | |
| 2001/0016842 A1 | 8/2001 | Umen et al. | |
| 2001/0018697 A1 | 8/2001 | Kunitake et al. | |
| 2001/0034739 A1 | 10/2001 | Anecki et al. | 707/500 |
| 2001/0039552 A1 | 11/2001 | Killi et al. | |
| 2001/0044809 A1 | 11/2001 | Parasnis et al. | |
| 2001/0044813 A1 | 11/2001 | Frank | |
| 2001/0051962 A1 | 12/2001 | Piotkin | |
| 2001/0054042 A1 | 12/2001 | Watkins et al. | |
| 2002/0004805 A1 | 1/2002 | Nojima et al. | |
| 2002/0016800 A1 | 2/2002 | Spivak et al. | |
| 2002/0038348 A1 | 3/2002 | Malone et al. | |
| 2002/0049790 A1 | 4/2002 | Ricker et al. | |
| 2002/0059265 A1 | 5/2002 | Valorose | |
| 2002/0059337 A1 | 5/2002 | Takaoka et al. | |
| 2002/0065848 A1 | 5/2002 | Walker et al. | 707/511 |
| 2002/0065857 A1 | 5/2002 | Michalewicz | |
| 2002/0073236 A1 | 6/2002 | Helgeson et al. | |
| 2002/0087602 A1 | 7/2002 | Masuda et al. | |
| 2002/0099797 A1 | 7/2002 | Merrell et al. | |
| 2002/0103835 A1 | 8/2002 | Kearney | |
| 2002/0107886 A1 | 8/2002 | Gentner et al. | |
| 2002/0111133 A1 | 8/2002 | Wittkotter | |
| 2002/0116421 A1 | 8/2002 | Fox et al. | |
| 2002/0120647 A1 | 8/2002 | Amano | |
| 2002/0129058 A1 | 9/2002 | Story et al. | |
| 2002/0174145 A1 | 11/2002 | Duga et al. | |
| 2002/0184263 A1 | 12/2002 | Perinet et al. | |
| 2002/0188638 A1 | 12/2002 | Hamscher | |
| 2002/0194220 A1 | 12/2002 | Sluiman | |
| 2003/0004957 A1 | 1/2003 | Broman et al. | |
| 2003/0023637 A1 * | 1/2003 | Halahmi | 707/523 |
| 2003/0028560 A1 | 2/2003 | Kudrolli et al. | |
| 2003/0033287 A1 | 2/2003 | Shanahan et al. | |
| 2003/0065946 A1 | 4/2003 | Holliday et al. | 713/201 |
| 2003/0074633 A1 | 4/2003 | Boulmakoul et al. | 715/506 |
| 2003/0079181 A1 | 4/2003 | Schumacher et al. | |
| 2003/0093520 A1 | 5/2003 | Beesley | |
| 2003/0115547 A1 | 6/2003 | Ohwada et al. | |
| 2003/0120671 A1 | 6/2003 | Kim et al. | 707/100 |
| 2003/0126136 A1 | 7/2003 | Omoigui | |
| 2003/0126260 A1 | 7/2003 | Husain et al. | |
| 2003/0137539 A1 | 7/2003 | Dees | |

| | | |
|---|---|---|
| 2003/0137691 A1 | 7/2003 | Tanaka ................... 358/1.15 |
| 2003/0142128 A1 | 7/2003 | Reulein et al. ............... 345/742 |
| 2003/0145134 A1 | 7/2003 | Wehage et al. |
| 2003/0149934 A1 | 8/2003 | Worden ..................... 715/513 |
| 2003/0149935 A1 | 8/2003 | Takizawa et al. ............ 715/513 |
| 2003/0158851 A1 | 8/2003 | Britton et al. |
| 2003/0163552 A1 | 8/2003 | Savitzky et al. |
| 2003/0167446 A1 | 9/2003 | Thomas ..................... 715/513 |
| 2003/0172168 A1 | 9/2003 | Mak et al. |
| 2003/0172343 A1 | 9/2003 | Leymaster et al. ........... 715/500 |
| 2003/0177446 A1 | 9/2003 | Gropper et al. .............. 715/522 |
| 2003/0177449 A1 | 9/2003 | Rose ........................ 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. ..... 715/530 |
| 2003/0221167 A1 | 11/2003 | Goldstein et al. ............ 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0003342 A1 | 1/2004 | Liao et al. ................ 715/501.1 |
| 2004/0003343 A1 | 1/2004 | Liao et al. |
| 2004/0003388 A1 | 1/2004 | Jacquemot et al. |
| 2004/0015782 A1 | 1/2004 | Day et al. |
| 2004/0015890 A1 | 1/2004 | Wong et al. |
| 2004/0015908 A1 | 1/2004 | Giel et al. ................... 717/141 |
| 2004/0019853 A1 | 1/2004 | Takizawa et al. ............ 715/523 |
| 2004/0030711 A1 | 2/2004 | Roudot |
| 2004/0030987 A1 | 2/2004 | Manelli ..................... 715/500 |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054697 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1 | 5/2004 | Lee et al. |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1 | 7/2004 | Hudson ..................... 715/530 |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1 | 9/2004 | Jones et al. |
| 2004/0172592 A1 | 9/2004 | Collie et al. |
| 2004/0181753 A1 | 9/2004 | Michaelides |
| 2004/0183837 A1 | 9/2004 | Watanabe et al. |
| 2004/0194025 A1 | 9/2004 | Hubert et al. |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. ............... 715/530 |
| 2004/0216048 A1 | 10/2004 | Brown et al. |
| 2004/0221233 A1 | 11/2004 | Thielen |
| 2004/0226012 A1 | 11/2004 | Awada et al. ............... 718/100 |
| 2004/0230894 A1 | 11/2004 | Elza et al. |
| 2004/0243551 A1 | 12/2004 | Boone et al. ................... 707/3 |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts ........................ 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ........... 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0025091 A1 | 2/2006 | Buford ..................... 455/154.2 |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080314 A1 | 4/2006 | Hurbert et al. |
| 2006/0080316 A1 | 4/2006 | Gilmore et al. |
| 2006/0080603 A1 | 4/2006 | Bailey et al. |
| 2006/0095834 A1 | 5/2006 | Jeon et al. |
| 2006/0117019 A1 | 6/2006 | Sylthe et al. |
| 2006/0136809 A1 | 6/2006 | Fernstrom .................... 715/505 |
| 2006/0155529 A1 | 7/2006 | Ludviksson et al. |
| 2006/0168562 A1 | 7/2006 | Emek et al. |
| 2006/0206794 A1 | 9/2006 | Ornstein et al. |
| 2006/0227150 A1 | 10/2006 | Yuan |
| 2007/0061384 A1 | 3/2007 | Harrington et al. |
| 2007/0136443 A1 | 6/2007 | Sah et al. |
| 2007/0136662 A1 | 6/2007 | Khaba |

FOREIGN PATENT DOCUMENTS

| | | |
|---|---|---|
| EP | 1 452 966 A2 | 11/2004 |
| EP | 1672543 | 11/2005 |
| EP | 1672528 | 12/2005 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |
| WO | WO 2006/133053 | 12/2006 |
| ZA | 2005/09350 | 4/2008 |

OTHER PUBLICATIONS

U.S. Appl. No. 10/731,900, filed Dec. 9, 2003, entitled "Context Free Document Portions."

U.S. Appl. No. 10/955,622, filed Sep. 30, 2004, entitled "Method, System, and Computer-Readable Medium for Creating, Inserting and Reusing Document Parts in an Electronic Document."

U.S. Appl. No. 11/018,405, filed Dec. 20, 2004, entitled "Context Free Document Portions With Alternate Formats."

U.S. Appl. No. 11/018,569, filed Dec. 20, 2004, entitled "Method and System for Linking Data Ranges of a Computer-Generated Document with Associated Extensible-Markup Language Elements."

U.S. Appl. No. 11/018,718, filed Dec. 20, 2004, entitled "File Formats, Methods, and Computer Program Products for Representing Documents".
U.S. Appl. No. 11/018,910, filed Dec. 20, 2004, entitled "File Formats, Methods, and Computer Program Products for Representing Presentations".
U.S. Appl. No. 11/018,912, filed Dec. 20, 2004, entitled "File Formats, Methods, and Computer Program Products for Workbooks".
U.S. Appl. No. 11/019,088, filed Dec. 20, 2004, entitled "Management and Use of Data in a Computer-Generated Document".
U.S. Appl. No. 11/019,095, filed Dec. 21, 2004, entitled "Method and System for Exposing Nested Data in a Computer-Generated Document in a Transparent Manner."
U.S. Appl. No. 11/072,659, filed Mar. 4, 2005, entitled "Method and Apparatus for Utilizing an Extensible Markup Language Schema to Defined Document Parts for Use in an Electronic Document."
U.S. Appl. No. 11/125,907, filed May 10, 2005, entitled "Structuring an Electronic Document for Efficient Identification and Use of Document Parts."
U.S. Appl. No. 11/389,367, filed Mar. 24, 2006, entitled Structuring Data for Spreadsheet Documents.
U.S. Appl. No. 11/431,931, filed May 10, 2006, entitled "Exposing Embedded Data in a Computer-Generated Document."
U.S. Appl. No. 11/445,903, filed Jun. 2, 2006, entitled "Structuring Data for Presentation Documents."
U.S. Appl. No. 11/072,188, filed Mar. 4, 2005 entitled "Method and Apparatus for Utilizing an Object Model to Manage Document Parts for Use in an Electronic Document".
U.S. Official Action mailed May 12, 2006 in U.S. Appl. No. 10/731,900.
Brauer M. et al., "Open Office Specification 1.0," Online Publication, Mar. 22, 2004, XP002404030; Retrieved from the Internet: URL:http://www.oasis-open.org/committees/download.php/6037/office-spec-1.0-cd-1.pdf on Oct. 20, 2006.
Anonymous: "Technical note TN2073: Deconstructing A Keynote 1.x Document: Part One—Slides," Online Publication, May 20, 2003, XP002404031, Retrieved from the Internet: URL: http:///developer.apple.com/technotes/tn2002/pdf/tn2073.pdf on Oct. 20, 2006.
Anonymous: "Technical Note 2067: About the Keynote XML File Format (APXL Schema)," Online Publication, Feb. 12, 2003, XP002404032; Retrieved from the Internet: URL:http://developer.apple.com/technotes/tn2002/pdf/tn2067.pdf on Oct. 20, 2006.
Anonymous: "Mulberry Slideshow XML (v 2.1): A User's Guide," Online Publication, Dec. 7, 2001, XP002404033; Retrieved from the Internet: URL:http://www.mulberrytech.com/slideshow/Mulberry-slideshow.zip on Oct. 20, 2006.
European Search Report dated Nov. 3, 2006 in Application No. 05111509.5.
Meyer, O. "a Tool—Creating Validated XML Documents on the Fly Using MS Word", Oct. 2002, pp. 113-121.
Microsoft Word, (hereinafter Word), copyright 2001, pp. 1-4.
OpenOffice.org, "OpenOffice.org User Guide for Version 1.1.x: Chapter 4: Spreadsheets in Calc", published May 7, 2004, pp. 1, 2, 179-254, http://documentation.openoffice.org/manuals/OO01.x.x/user_guide.pdf.
OpenOffice.org, "OpenOffice.org User Guide for Version 1.1.x: Chapter 5: Creating Presentations With Impress", published May 7, 2004, pp. 1, 2, 255-286, http://documentation.openoffice.org/manuals/OO01.x.x/user_guide.pdf.
ReplyAssistant, copyright 2001, pp. 1-34.
Whitmer, R., "Document Object Model (DOM) Level 3 Xpath Specification", W3C, URL:http://www.w3.org/TR/DOM-Level-3-XPath/, Feb. 26, 2004, Version 1.0, 18 pp.
U.S. Official Action mailed Feb. 21, 2007 in U.S. Appl. No. 11/018,569.
U.S. Official Action mailed Feb. 28, 2007 in U.S. Appl. No. 10/731,900.
U.S. Official Action mailed Mar. 7, 2007 in U.S. Appl. No. 11/018,912.
U.S. Official Action mailed Mar. 21, 2007 in U.S. Appl. No. 11/018,910.
U.S. Official Action mailed Mar. 21, 2007 in U.S. Appl. No. 11/019,088.
U.S. Official Action mailed May 8, 2007 in U.S. Appl. No. 11/072,188.
U.S. Official Action mailed Jun. 14, 2007 in U.S. Appl. No. 10/955,622.
U.S. Official Action mailed Jun. 19, 2007 in U.S. Appl. No. 11/018,718.
U.S. Official Action dated Mar. 7, 2007 in U.S. Appl. No. 11/018,912.
U.S. Official Action dated Jul. 26, 2007 in U.S. Appl. No. 11/018,569.
"@try inCSS3 (was: Useragent Rules in CSS)", http://lists.w3.org/Archives/Public/www-style/2004Mar/0333.html, 2 pages (Mar. 31, 2004).
"Apache Server Frequently Asked Questions", Apache HTTP Server Version 1.3, http://httpd.apache.org/docs/1.3/misc/FAQ.html; 43 pages.
"Controlling the Data Chaos by Adding Intelligence to Media", 4 pages (2004).
"Networked File System", http://www.scit.wlv.ac.uk/~jphb/comms/nfs.htm; 7 pages.
"Open eBook Publication Structure 1.2", http://www.idpf.org/oebps/oebps1.2/download/oeb12-xhtml.htm, 71 pages (Aug. 27, 2002).
Bleuthman et al., "Interleaved Graphics and Text", IBM Technical Disclosure Bulletin, vol. 22, No. 11, pp. 4813-4815 (Apr. 1980).
Chien et al., "Efficient Schemes for Managing Multiversion XML Documents", The VLDB Journal, vol. 11, pp. 332-353 (2002).
Christodoulakis et al., "Multimedia Document Presentation, Information, Extraction, and Document Formation in MINOS: A Model and a System", ACM Transactions on Office Information Systems, vol. 4, No. 4, pp. 345-383 (Oct. 1986).
El-Kwae et al., "Document Image Representation Using XML Technologies", Proceedings of SPIE, vol. 4670, pp. 109-120 (2002).
Ellis, "Postscrip, Bezier Curves and Chinese Characters", ACM, pp. 162-165 (1989).
Girardot et al., "Efficient Representation and Streaming of XML Content Over the Internet Medium", IEEE, pp. 67-70 (2000).
Han et al., "WebSplitter: A Unified XML Framework for Multi-Device Collaborative Web Browsing", ACM, pp. 221-230 (2000).
Hardy et al., "Mapping and Displaying Structural Transformations Between XML and PDF", ACM 2002, pp. 95-102 (2002).
Holman, "What is XSL-FO", Google Mar. 20, 2002, http://www.xml.com/pub/a/2002/03/20/xsl-fo.html, 18 pages.
Jacobs et al., "Adaptive Grid-Based Document Layout", ACM Transactions on Graphics, vol. 22, No. 2, pp. 838-847 (Jul. 2003).
Marco et al., "A Framework for Designing and Implementing the Ada Standard Container Library", ACM, pp. 49-61 (2003).
Miller, "An Introduction to the Resource Description Framework", D-Lib Magazine, ISSN 1082-9873, http://www.dlib.org/dlib/may98/miller/05miller.html, 10 pages (May 1998).
Obasanjo, "Designing Extensible, Versionable XML Formats", Google Jul. 21, 2004, http://www.xml.com/pub/a/2004/07/21/design.html, 17 pages.
Obasanjo, "Designing XML Formats: Versioning vs. Extensibility", Google 2004, blogs.msdn.com/dareobasanjo/archive/2004/04/11/111369.aspx. One additional page is included to show the actual date of the article which is Nov. 17, 2004, 24 pages.
Obasanjo, Designing XML Formats: Versioning vs. Extensibility, Google Apr. 11, 2004, blogs.msdn.com/dareobasanjo/archive/2004/04/11/111369.aspx, 3 pages.
Office Action Correspondence Subsystem, version 1.3 (herein after OACS), copyright Feb. 2003, pp. 1-2 to 1-123, 2-2 to 2-122 and 3-2 to 3-44).
Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003), 12 pages.
Pawson, "Printing from XML: An Introduction to XSL-FO,", Google Oct. 9, 2002, http://www.xml.com/pub/a/2002/10/09/xslfo.html, 6 pages.
Peters et al., "CrystalWeb-A Distributed Authoring Environment for the World-Wide Web," Computer Networks and ISDN Systems, vol. 27, No. 6, pp. 861-870 (Apr. 1995).

Sahuguet et al., "Building Intelligent Web Applications Using Lightweight Wrappers", Data and Knowledge Engineering, vol. 36, pp. 283-316 (2001).
StarOffice 7 Office Suite, A Sun ONE Software Offering, Basic Programmer's Guide, pp. 1-10, 47, 91, 104 (Jul. 2003).
Steele, "Easy Microsoft Office Word 2003", published Sep. 19, 2003, Que Corporation, pp. 52, 53 and 216 (6 total pages).
Unknown, ReplyAssistant Version 1.1, downloaded from <http://www.goldmedalsoft.com/shareware/Business_Finance-Miscellaneous-ReplyAssistant-1.1.html>, Copyright 2000-2001, 7 figures, 5 pages ReadMet, 1 page About ReplyAssistant, 15 pages.
van Leeuwen et al., "XML for Flexibility and Extensibility of Design Information Models", Proceedings of the CAADRIA, University of Sydney, Australia, pp. 491-502 (2001).
U.S. Official Action mailed Aug. 9, 2007 in U.S. Appl. No. 10/731,900.
U.S. Official Action mailed Sep. 20, 2005 in U.S. Appl. No. 10/836,326.
U.S. Official Action mailed May 31, 2006 in U.S. Appl. No. 10/836,326.
U.S. Official Action mailed Oct. 20, 2006 in U.S. Appl. No. 10/836,326.
U.S. Official Action mailed Apr. 9, 2007 in U.S. Appl. No. 10/836,326.
U.S. Official Action mailed Jul. 26, 2007 in U.S. Appl. No. 10/836,326.
U.S. Official Action mailed Feb. 22, 2008 in U.S. Appl. No. 10/836,327.
U.S. Official Action mailed Jun. 28, 2006 in U.S. Appl. No. 10/836,608.
U.S. Official Action mailed Dec. 12, 2006 in U.S. Appl. No. 10/836,608.
U.S. Official Action mailed Mar. 8, 2007 in U.S. Appl. No. 10/836,608.
U.S. Official Action mailed Jul. 27, 2007 in U.S. Appl. No. 10/836,608.
U.S. Official Action mailed Jan. 24, 2005 in U.S. Appl. No. 10/837,040.
U.S. Official Action mailed Jul. 15, 2005 in U.S. Appl. No. 10/837,040.
U.S. Official Action mailed Oct. 18, 2005 in U.S. Appl. No. 10/837,040.
U.S. Official Action mailed Apr. 6, 2006 in U.S. Appl. No. 10/837,040.
U.S. Official Action mailed Sep. 29, 2006 in U.S. Appl. No. 10/837,040.
U.S. Official Action mailed Dec. 19, 2006 in U.S. Appl. No. 10/837,040.
U.S. Official Action mailed May 15, 2007 in U.S. Appl. No. 10/837,040.
U.S. Official Action mailed Mar. 17, 2008 in U.S. Appl. No. 10/955,622.
U.S. Official Action mailed Aug. 2, 2007 in U.S. Appl. No. 11/018,405.
U.S. Official Action mailed Mar. 18, 2008 in U.S. Appl. No. 11/018,569.
U.S. Official Action mailed Oct. 3, 2007 in U.S. Appl. No. 11/018,910.
U.S. Official Action mailed Oct. 1, 2007 in U.S. Appl. No. 11/018,912.
U.S. Official Action mailed Dec. 28, 2007 in U.S. Appl. No. 11/072,188.
U.S. Official Action mailed Sep. 17, 2007 in U.S. Appl. No. 11/072,659.
U.S. Official Action mailed Feb. 4, 2008 in U.S. Appl. No. 11/125,907.
U.S. Official Action mailed Aug. 29, 2006 in U.S. Appl. No. 11/222,344.
U.S. Official Action mailed Feb. 22, 2007 in U.S. Appl. No. 11/222,344.
U.S. Official Action mailed Aug. 1, 2007 in U.S. Appl. No. 11/222,344.
U.S. Official Action mailed Oct. 3, 2006 in U.S. Appl. No. 11/222,442.
U.S. Official Action mailed Feb. 20, 2007 in U.S. Appl. No. 11/222,442.
U.S. Official Action mailed Jul. 10, 2007 in U.S. Appl. No. 11/222,442.
European Search Report dated December 19, 2007 in EP 05111677.0.
European Search Report dated December 19, 2007 in EP 05111375.1.
European Search Report dated December 19, 2007 in EP 05112123.4.
European Examination Report dated Mar. 3, 3008 in EP 05111375.1.
Halvorson et al., "Microsoft Office XP Inside Out, 2001", Microsoft Press, pp. 272, 273 and 289.
"Introduction to SpreadsheetML", Online Helpfile 'OFFICEXMLSDK.CHM' extracted from 'OFFICE2003XMLSCHEMA.Exe', Dec. 5, 2003 http://www.microsoft.com/downloads/details.aspx?familyid=fe118952-3547-420a-a412-00a2662442d9&displaying=en, retrieved on Apr. 10, 2008, 58 pp.
"Comparative Assessment of Open Documents Formats Market Overview - Valoris", 2003, http://europa.eu/int/idabc/en/document/3439, retrieved on Apr. 10, 2008, 40 pp.
"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.
U.S. Official Action mailed May 14, 2008 in U.S. Appl. No. 10/731,900 (60001.0276US01), 11 pgs.
U.S. Official Action mailed Jun. 26, 2008 in U.S. Appl. No. 11/072,659 (14917.0066U511), 12 pgs.
U.S. Official Action mailed Jul. 9, 2008 in U.S. Appl. No. 11/019,088 (60001.0440U501), 31 pgs.
European Search Report dated Mar. 26, 2008 in EP 05111677.0 (60001.0441EP01), 5 pgs.
European Search Report dated Apr. 22, 2008 in EP 05111549.1 (60001.0447EP01), 11 pgs.
PCT Search Report dated Jun. 25, 2008 in PCT/US2006/21673 (14917.0187U5U1), 10 pgs.
European Communication dated Jul. 22, 2008 in EP 05111549.1 (60001.0447EP01), 8 pgs.
Chinese Office Action dated Aug. 1, 2008 in 200510126792.8 (60001.0440CC01), 20 pgs.
"Comparative Assessment of Open Documents Formats Market Overview - Valoris", 2003, http://europa.eu/int/idabc/en/document/3439, retrieved on Apr. 10, 2008, 40 pp.
"Introduction to SpreadsheetML", Online Helpfile 'OFFICEXMLSDK.CHM' extracted from ' OFFICE2003XMLSCHEMA.Exe', Dec. 5, 2003 http://www.microsoft.com/downloads/details.aspx?familyid=fe118952-3547-420a-a412- 00a2662442d9&displaying=en, retrieved on Apr. 10, 2008, 58 pp.
"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.
Halvorson et al., "Microsoft Office XP Inside Out, 2001", Microsoft Press, pp. 272, 273 and 289.
Orchard et al. "[Editorial Draft] Versioning XML Languages W3C Proposed TAG Finding", http://www.w3.org/2001/tag/doc/versioning-20031116, Nov. 16, 2003, pp. 1-23.
Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.
U.S. Official Action mailed Dec. 17, 2008 in U.S. Appl. No. 11/019,088.
U.S. Official Action mailed Jan. 23, 2009 in U.S. Appl. No. 11/389,367.

U.S. Official Action mailed Feb. 2, 2009 in U.S. Appl. No. 11/445,903.
Chinese Office Action dated Jul. 18, 2008 in 200510126789.6.
Chinese First Office Action dated Jan. 9, 2009 in 200510127115.8.
Chinese Second Office Action dated Jan. 16, 2009 in 200510125062.6.
Chinese Second Office Action dated Feb. 6, 2009 in 200510126789.6.
Chinese First Office Action dated Feb. 6, 2009 in 200510088462.4.
U.S. Official Action mailed Jul. 22, 2008 in U.S. Appl. No. 11/072,188 (14917.0065U5I1), 26 pgs.
U.S. Official Action mailed Oct. 30, 2008 in U.S. Appl. No. 11/125,907 (14917.000084U501), 18 pgs.
U.S. Official Action mailed Nov. 14, 2008 in U.S. Appl. No. 11/072,659 (14917.0066U511), 29 pgs.
European Search Report dated Nov. 30, 2007 in EP 05105111.8 (60001.0421EP01), 3 pgs.
European Examination Report dated Mar. 14, 2008 in EP 05105111.8 (60001.0421EP01), 5 pgs.
Chinese Office Action dated Jul. 18, 2008 in 200510126789.6 (60001.0443CC01), 31 pgs.
Chinese Office Action dated Aug. 1, 2008 in 200510126798.5 (60001.0446CC01), 26 pgs.
Chinese Office Action dated Aug. 22, 2008 in 200510125059.4 (60001.0441CC01), 28 pgs.
Chinese Office Action dated Oct. 31, 2008 in 200510125058.X (60001.0447CC01), 15 pgs.
European Search Report dated Dec. 15, 2008 in EP 05111511.1 (60001.0440EP01), 7 pgs.
Jones, B., "Word XML's Context Free Chunks: Building a Document from Multiple Pieces of Content", http://blogs.msdn.com/brian_jones_archive/2005/07/20/441167.aspx, Jul. 20, 2005, 4 pp.
Carrano, "Data Abstraction and Problem Solving with C++", copyright 1995, pp. 14-16.
U.S. Official Action mailed Apr. 16, 2009 in U.S. Appl. No. 11/072,188 (14917.0065USI1).
PCT Search Report dated Jul. 3, 2007 in PCT/US2006/21825 (14917.0184).
European Communication dated Mar. 26, 2008 in EP 05112123.4 (60001.0446EP01).
Chinese Office Action dated Aug. 1, 2008 in 200510125062.6 (60001.0442CC01).
Chinese Second Office Action dated Mar. 6, 2009 in 200510126798.5 (60001.0446CC01).
European Search Report dated Mar. 11, 2009 in EP 05111550.9 (60001.0453EPI1).
European Communication dated Mar. 12, 2009 in EP 05111375.1 (60001.0442EP01).
Adobe Creative Team, "Adobe Acrobat 5.0 Classroom in a Book", published Jun. 26, 2001, Adobe Press, pp. 1-26+cover page (27 pp.).
Chinese Second Office Action dated Mar. 13, 2009 in 200480001395.1 (308874.04), pp. 1-7.
Chinese Second Office Action dated Mar. 27, 2009 in 20040001339.08 (304846.04), pp. 1-7.
Chinese Decision on Rejection dated Mar. 27, 2009 in 200480001336.4 (308877.04), pp. 1-17.
Chinese Decision on Rejection dated May 8, 2009 in 200510125059.04 (60001.0441CC01), pp. 1-14.
Chinese Third Office Action dated Jun. 5, 2009 in 200510126789.6 (60001.0443CC01), pp. 1-7.
Russian Official Action dated Jan. 13, 2008 in 2412-139543RU/8132 (304698.10), pp. 1-9.
Proydakov, E.M., "English-Russian Explanatory Dictionary in Computing Engineering, Internet, and Programming", Moscow: publishing house "Russian edition", 2001, pp. 1-3.
Gudgin, M., "SOAP Version 1.2 Part 1: Messaging Framework", W3C Candidate Recommendation (Dec. 19, 2002), pp. 1-65.
Chinese Second Office Action dated Jun. 5, 2009 in 200480001312.9, pp. 1-9.
Chinese Third Office Action dated Jul. 17, 2009 in 200480001395.01, pp. 1-7.
European Communication dated Jul. 10, 2009 in EP 05111511.1-1527 (60001.0440EP01), pp. 1-5.

* cited by examiner styles.xml — *423*
application/vnd.ms-word.styles+xml
Schema:
Part Occurrence: Optional
Zip Path: \word\styles.xml lists.xml — *422*
application/vnd.ms-word.listDefs+xml
Schema:
Part Occurrence: Optional
Zip Path: \word\lists.xml settings1.xml — *426*
application/vnd.ms-word.settings+xml
Schema: Unknown
Part Occurrence: Optional
Zip Path: /word/settings1.xml comments.xml — *424*
application/vnd.ms-word.comments+xml
Schema:
Part Occurrence: Optional
Zip Path: /word/comments.xml item1.xml — *425*
application/xml
Schema: Open
Part Occurrence: Optional
Zip Path: /customXML/item1.xml
http://schemas.microsoft.com/office/2006/relationships/datastoreItemProps ☐ item1props.xml — *427*
application/xml
Schema:
Part Occurrence: Optional
Zip Path: /customXML/item1props.xml

*Fig. 4b* header1.xml — 430

| application/vnd.ms-word.header+xml |
|---|
| Schema: |
| Part Occurrence: Optional |
| Zip Path: /word/header1.xml | footer1.xml — 432

| application/vnd.ms-word.footer+xml |
|---|
| Schema: |
| Part Occurrence: Optional |
| Zip Path: /word/footer1.xml | footnotes.xml — 434

| application/vnd.ms-word.footnotes+xml |
|---|
| Schema: |
| Part Occurrence: Optional |
| Zip Path: /word/footnotes.xml | endnotes.xml — 435

| application/vnd.ms-word.endnotes+xml |
|---|
| Schema: |
| Part Occurrence: Optional |
| Zip Path: /word/endnotes.xml | image1.png — 437

| image/png |
|---|
| Schema: |
| Part Occurrence: Optional |
| Zip Path: /word/media/image1.png | fontTable.xml — 438

| application/vnd.ms-word.fontTable+xml |
|---|
| Schema: WordML |
| Part Occurrence: Optional |
| Zip Path: /word/fontTable.xml |

*Fig. 4c*

STRUCTURING DATA FOR WORD PROCESSING DOCUMENTS

RELATED APPLICATIONS

This utility patent application claims the benefit under 35 United States Code § 119(e) of U.S. Provisional Patent Application No. 60/687,261 filed on Jun. 3, 2005, U.S. Provisional Patent Application No. 60/716,805 filed on Sep. 13, 2005, and is a continuation in part of U.S. patent application Ser. No. 11/018,718 filed on Dec. 20, 2004 all of which are hereby incorporated by reference in their entirety.

REFERENCE TO COMPUTER PROGRAM LISTING APPENDIX

The following compact disc submission includes two compact discs each having identical ASCII text files in the IBM-PC machine format and are compatible for reading with MS-DOS and MS-WINDOWS operating systems. The computer program listing files submitted on the compact discs are incorporated herein by reference in their entirety as if set forth in full in this document for all purposes: FILENAME: WORD12 CLEAN.txt; CREATION DATE: Mar. 31, 2006; FILE SIZE (bytes): 173 KB.

BACKGROUND

Developers looking to manipulate the content of a document have to know how to read and write data according to the file format of the document. This process can be complex and challenging. Attempting to alter a document programmatically without the associated application has been identified as a leading cause of file corruption, and has deterred some developers from even attempting to try to make alterations to the files. These documents are also stored in file formats that are typically proprietary. As such, each company that creates a file may utilize a different file format. Accessing the information that is contained within a proprietary format can be next to impossible. Reusing information between different applications can also be very difficult. Special code is usually required to be written to create reader and writer classes that can handle extracting and locating information within the proprietary file formats.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An open file format is used to represent the features and data associated with a word processing application within a document. The open file format is directed at simplifying the way a word processing application organizes document features and data, and presents a logical model that is easily accessible. A document structured according to the open file format is designed such that it is made up of a collection of modular parts that are stored within a container. The modular parts are logically separate but are associated with one another by one or more relationships. Each of the modular parts is capable of being interrogated separately regardless of whether or not the application that created the document is running. Each modular part is capable of having information extracted from it and copied into another document and reused. Information may also be changed, added, and deleted from each of the modular parts. Common data, such as strings, functions, etc., may be stored in their own modular part such that the document does not contain excessive amounts of redundant data. Additionally, code, personal information, comments, as well as any other determined information might be stored in a separate modular part such that the information may be easily parsed and/or removed from the document.

The open file formats not only work with document files, but also work with templates. The improved schema supports features that work in templates. For example, such features may include auto text, the ability to have auto text as a collection of document fragments richly formatted inside of a template accessible for insertion into documents.

These and various other features, as well as other advantages, will be apparent from a reading of the following detailed description and a review of the associated drawings.

BRIEF DESCRIPTION OF THE DRAWINGS

FIGS. 4*a*-4*c* are block diagrams illustrating a document relationship hierarchy for various modular parts utilized in a file format for representing a word processing document.

DETAILED DESCRIPTION

Figure 1:
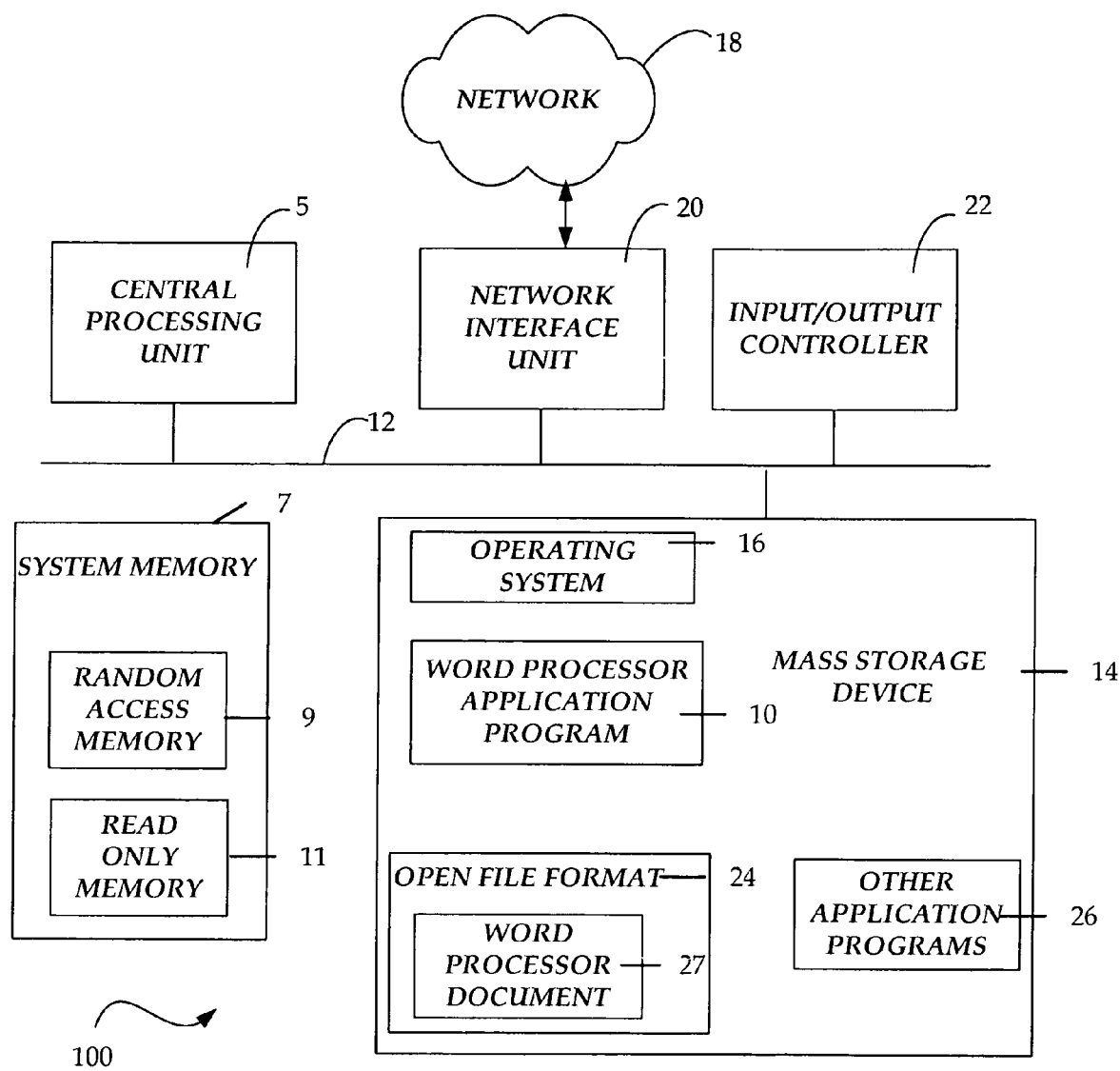
FIG. 1 illustrates an exemplary computing device that may be used in exemplary embodiments of the present invention.

Referring now to the drawings, in which like numerals represent like elements, various aspects will be described herein. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, other types of computer systems and program modules may be used.

Generally, program modules include routines, programs, operations, components, data structures, and other types of structures that perform particular tasks or implement particular abstract data types. Moreover, other computer system configurations, including hand-held devices, multiprocessor systems, microprocessor-based or programmable consumer electronics, minicomputers, mainframe computers, and the like may be used. A distributed computing environment where tasks are performed by remote processing devices that are linked through a communications network may also be utilized. In a distributed computing environment, program modules may be located in both local and remote memory storage devices.

Referring now to FIG. 1, an illustrative computer architecture for a computer 100 will be described. The computer architecture shown in FIG. 1 illustrates a computing apparatus, such as a server, desktop, laptop, or handheld computing apparatus, including a central processing unit 5 ("CPU"), a system memory 7, including a random access memory 9 ("RAM") and a read-only memory ("ROM") 11, and a system bus 12 that couples the memory to the CPU 5. A basic input/ output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVJS"), or other optical storage, magnetic cassettes, magnetic tape, magnetic disk storage or other magnetic storage devices, or any other medium which can be used to store the desired information and which can be accessed by the computer 100.

The computer 100 may operate in a networked environment using logical connections to remote computers through a network 18, such as the Internet. The computer 100 may connect to the network 18 through a network interface unit 20 connected to the bus 12. The network interface unit 20 may also be utilized to connect to other types of networks and remote computer systems. The computer 100 may also include an input/output controller 22 for receiving and processing input from a number of other devices, including a keyboard, mouse, or electronic stylus (not shown). Similarly, an input/output controller 22 may provide output to a display screen, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processor application program 10. The word processor application program 10 is operative to provide functionality for the creation and structure of a word processor document, such as a document 27, in an open file format 24. According to one embodiment, the word processor application program 10 and other application programs 26 comprise the OFFICE suite of application programs from MICROSOFT CORPORATION including the WORD, EXCEL, and POWERPOINT application programs.

The open file format 24 simplifies and clarifies the organization of document features and data. The word processor program 10 organizes the 'parts' of a document (styles, strings, document properties, application properties, custom properties, functions, and the like) into logical, separate pieces, and then expresses relationships among the separate parts. These relationships, and the logical separation of 'parts' of a document, make up a file organization that can be easily accessed without having to understand a proprietary format.

The open file format 24 may be formatted according to extensible markup language ("XML"). XML is a standard format for communicating data. In the XML data format, a schema is used to provide XML data with a set of grammatical and data type rules governing the types and structure of data that may be communicated. The modular parts may also be included within a container. According to one embodiment, the modular parts are stored in a container according to the ZIP format. Additionally, since the open file format 24 is expressed as XML, formulas within a word processor document are represented as standard text making them easy to locate as well as modify.

Documents that follow the open file format 24 are programmatically accessible both while the word processor program 10 is running and not running. This enables a significant number of new uses that were simply too hard for previous file formats to accomplish. For instance, a server-side program is able to create a document based on input from a user or some other source. With the industry standard XML at the core of the open file format, exchanging data between applications created by different businesses is greatly simplified. Without requiring access to the application that created the document, solutions can alter information inside a document or create a document entirely from scratch by using standard tools and technologies capable of manipulating XML. The open file format has been designed to be more robust than the binary formats, and, therefore, reduces the risk of lost information due to damaged or corrupted files. Even documents created or altered outside of the creating application are less likely to corrupt, as programs that open the files may be configured to verify the parts of the document.

The openness of the open file format also translates to more secure and transparent files. Documents can be shared confidently because personally identifiable information and business sensitive information, such as user names, comments and file paths, can be easily identified and removed from the document. Similarly, files containing content, such as OLE objects or Visual Basic® for Applications (VBA) code can be identified for special processing.

Figure 2:
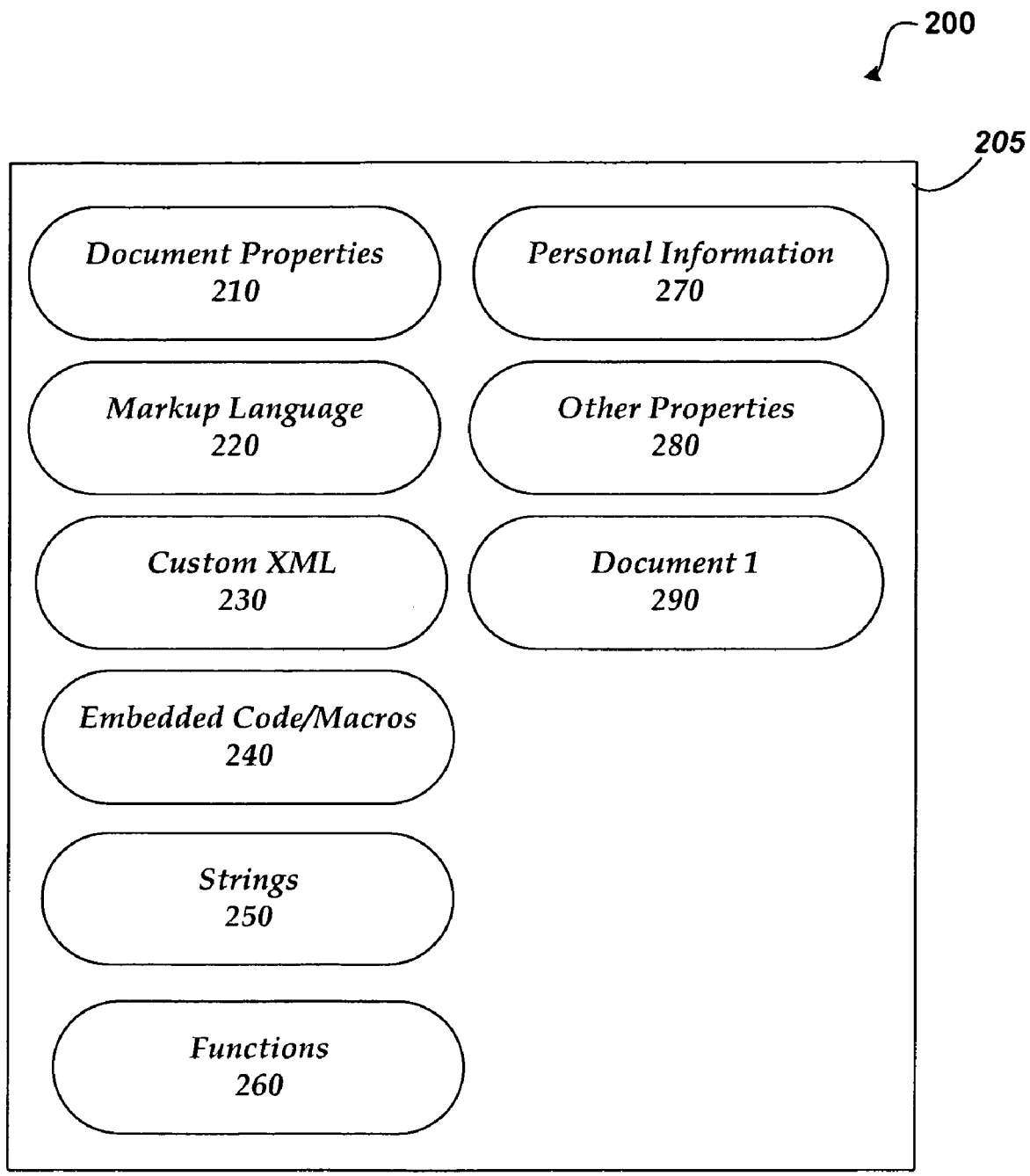
FIG. 2 shows an exemplary document container with modular parts.

FIG. 2 shows an exemplary document container with modular parts. As illustrated, document container 200 includes document properties 210, markup language 220, custom-defined XML 230, embedded code/macros 240, strings 250, functions 260, personal information 270, other properties 280, and document 1 (290) that are associated with a word processor document (See FIG. 3 and related discussion).

Each modular part (210-290) is enclosed by container 205. According to one embodiment, the container is a ZIP container. The combination of XML with ZIP compression allows for a very robust and modular format that enables a large number of new scenarios. Each file may be composed of a collection of any number of parts that defines the document. Most of the modular parts making up the document are XML files that describe application data, metadata, and even customer data stored inside the container 205. Other non-XML parts may also be included within the container, and include such parts as binary files representing images or OLE objects embedded in the document. Parts of the document specify a relationship to other parts (See FIGS. 4a-4c and related discussion). While the parts make up the content of the file, the relationships describe how the pieces of content work together. The result is an open file format for documents that is tightly integrated but modular and highly flexible.

There are many elements that go into creating a word processor document. Some of the parts may be commonly shared across applications, such as document properties, styles, charts, hyperlinks, comments, annotations, and the like. Other parts, however, may be specific to each application.

When users save or create a document, a single file is written to storage within container 205. The container 205 may then easily be opened by any application that can process XML. By wrapping the individual parts of a file in a container 205, each document remains a single file instance. Once a container 205 has been opened, developers can manipulate any of the modular parts (210-290) that are found within the container 205 that define the document. For instance, a developer can open a word processor document container that uses the open file format, locate the XML part that represents a particular portion of the word processor document, such as sheet 1, alter the part corresponding to document 1 (290) by using any technology capable of editing XML, and return the XML part to the container package 205 to create an updated word processor document. This scenario is only one of the essentially countless others that will be possible as a result of open format.

The modularity of the parts making up the document enables a developer to quickly locate a specific part of the file and work directly with just that part. The individual parts can be edited, exchanged, or even removed depending on the desired outcome of a specific business need. The modular parts can be of different physical content types. According to one embodiment, the parts used to describe program data are stored as XML. These parts conform to the XML reference schema(s) (220, 230) that defines the associated feature or object. For example, in a word processor file, the data that represents a word processor document header is found in an XML part that adheres to the schema for a Word Processor Document.

The schemas that represent parts of documents are fully documented and made available such that other applications may use them. Then, by using any standard XML based technologies, developers can apply their knowledge of the schemas to easily parse and create a document that is associated with a specific application. For example, a word processor document could be created for MICROSOFT WORD without having to use MICROSOFT WORD to open the document. Although the schemas included as part of this application are quite extensive, in order to fully represent the rich feature sets that the MICROSOFT WORD and OFFICE programs provide, all structures defined by the format are not required to generate a document. Applications are quite capable of opening the file with a minimal amount of items defined, thereby making it easy to create many documents. The XML reference schemas govern display-oriented attributes and document formatting, while customer-defined schemas define data-oriented structures that represent the business information stored within the document, and can be unique to a particular business or industry.

In some instances, it is advantageous to have the modular parts stored in their native content type. For example, images may be stored as binary files (.png, .jpg, and so on) within the container 205. Therefore, the container 205 may be opened by using a ZIP utility and the image may then be immediately viewed, edited, or replaced in its native format. Not only is this storage approach more accessible, but it requires less internal processing and disk space than storing an image as encoded XML. Other example parts that may be stored natively as binary parts include VBA projects and embedded OLE objects. Obviously, many other parts may also be stored natively. For developers, accessibility makes many scenarios more attractive. For instance, a developer could implement a solution that iterates a collection of word processor documents to update an embedded spreadsheet with an updated value/string/function.

Security is very important today in information technology. The open file format allows developers to be more confident about working with documents and delivering solutions that take document security into full account. With the open file format, developers can build solutions that search for and remove any identified, potential vulnerabilities, such as embedded code/macros 240 before they cause issues.

For example, assume a company needs a solution to prepare documents either for storage in an archive library where they would never need to run custom code, or for sending macro-free documents to a customer. An application could be written that removes all VBA code from a body of documents by iterating through the documents and removing the [VBAProject.bin] part and its corresponding relationship. The result would be a collection of higher-quality documents. Other code that is a security risk may also be removed. Code that is included within documents, however, is not the only potential security threat. Developers can circumvent potential risks from binaries, such as OLE objects or even images, by interrogating the documents and removing any exposures that arise. For example, if a specific OLE object is identified as a known issue, a program could be created to locate and cleanse or quarantine any documents containing the object. Likewise, any external references being made from a document can be readily identified. This identification allows solution developers to decide if external resources being referenced from a document are trustworthy or require corrective action.

As programs seek to protect users from malicious content, developers can also help protect users from accidentally sharing data inappropriately. This protection might be in the form of personally identifiable information 270 stored within a document, or comments and annotations that information so marked shouldn't leave the department or organization. Developers can programmatically remove both types of information directly without having to parse an entire document. To remove document comments, for example, a developer can check for the existence of a comment part relationship and, if found, remove the associated comment part.

Besides securing the personal information and comments, the open file format enables access to this information that may be useful in other ways. A developer may create a solution that uses the personal information 270 to return a list of documents authored by an individual person or from a specific organization. This list can be produced without having to open an application or use its object model with the open file format. Similarly, an application could loop through a folder or volume of documents and aggregate all of the comments within the documents. Additional criteria could be applied to qualify the comments and help users better manage the collaboration process as they create documents. This transparency helps increase the trustworthiness of documents and document-related processes by allowing programs or users to verify the contents of a document without opening the file. The open file format enables users or applications to see and identify the various parts of a file and to choose whether to load specific components. For example, a user can choose to load macro-code independently from document content and other file components. In particular, the ability to identify and handle embedded code 240 supports compliance management and helps reduce security concerns around malicious document code.

Likewise, personally identifiable or business-sensitive information (270) (for example, comments, deletions, user names, file paths, and other document metadata) can be clearly identified and separated from the document data. As a result, organizations can more effectively enforce policies or best practices related to security, privacy, and document management, and they can exchange documents more confidently.

Figure 3:
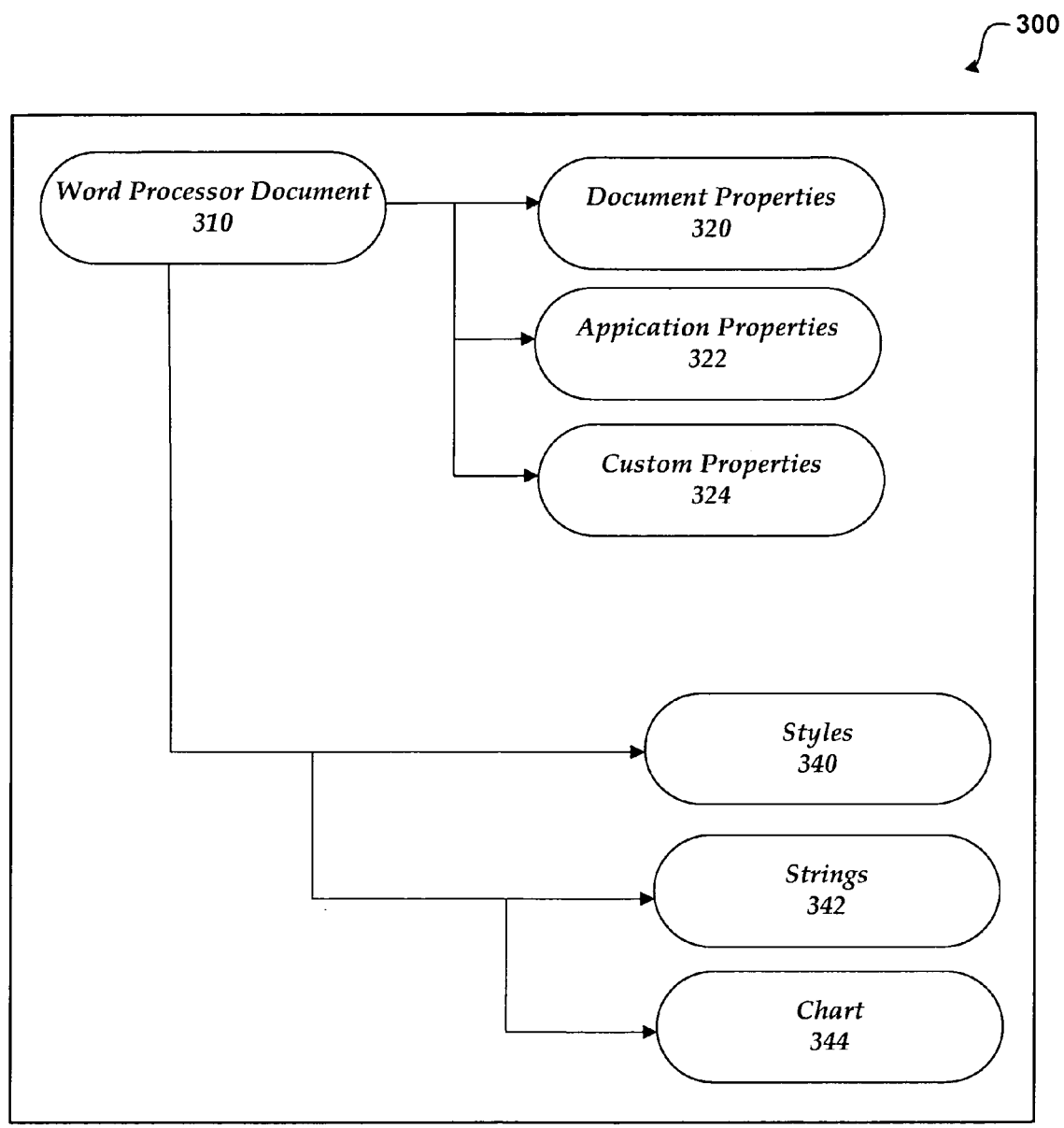
FIG. 3 shows a high-level relationship diagram of a word processing document within a container.

FIG. 3 shows a high-level relationship diagram of a word processor document within a container. As illustrated, the exemplary container 300 includes word processor document 310, document properties 320, application properties 322, and custom properties 324. The word processor document includes a reference to styles 340, strings 342 and chart 344. Many other configurations of the modular parts and the relationships may be defined. For example, referring to FIGS. 4a-4c which provides more detail regarding relationships among modular parts, it can be seen that a word processor document may include many more modular parts and relationships.

Whereas the parts are the individual elements that make up a document, the relationships are the method used to specify how the collection of parts comes together to form the actual document. The relationships are defined by using XML, which specifies the connection between a source part and a target resource. For example, the connection between a word processor document and a style that appears in that word processor document is identified by a relationship. The relationships are stored within XML parts or "relationship parts" in the document container 300. If a source part has multiple relationships, all subsequent relationships are listed in same XML relationship part. Each part within the container is referenced by at least one relationship. The implementation of relationships makes it possible for the parts never to directly reference other parts, and connections between the parts are directly discoverable without having to look within the content. Within the parts, the references to relationships are represented using a Relationship ID, which allows all connections between parts to stay independent of content-specific schema.

The following is an example of a relationship part in a document containing a header and an image:

The relationships may represent not only internal document references but also external resources. For example, if a document contains linked pictures or objects, these are represented using relationships as well. This makes links in a document to external sources easy to locate, inspect and alter. It also offers developers the opportunity to repair broken external links, validate unfamiliar sources or remove potentially harmful links.

The use of relationships in the open file format benefits developers in a number of ways. Relationships simplify the process of locating content within a document. The documents parts don't need to be parsed to locate content whether it is internal or external document resources. Relationships also allow a user to quickly take inventory of all the content within a document. For example, if the number of footnotes in a word processor document need to be counted, the relationships could be inspected to determine how many sheet parts exist within the container. The relationships may also be used to examine the type of content in a document. This is helpful in instances where there is a need to identify if a document contains a particular type of content that may be harmful, such as an OLE object that is suspect, or helpful, as in a scenario where there is a desire to extract all JPEG images from a document for re-use elsewhere. Additionally, relationships allow developers to manipulate documents without having to learn application specific syntax or content markup. For example, without any knowledge of how to program a word processor application, a developer solution could easily remove a footnote by editing the document's relationships.

According to one embodiment, documents saved in the open file format are considered to be macro-free files and therefore do not contain code. This behavior helps to ensure that malicious code residing in a default document can never be unexpectedly executed. While documents can still contain and use macros, the user or developer specifically saves these documents as a macro-enabled document type. This safeguard does not affect a developer's ability to build solutions, but allows organizations to use documents with more confidence.

Macro-enabled files have the same file format as macro-free files, but contain additional parts that macro-free files do not. The additional parts depend on the type of automation

```
<?xml version="1.0" encoding="UTF-8" standalone="yes"?>
<Relationships xmlns="http://schemas.openxmlformats.org/package/2005/06/relationships">
        <Relationship Id="rId8"
Type="http://schemas.openxmlformats.org/officedocument/2006/relationships/fontTable"
Target="fontTable.xml" />
        <Relationship Id="rId3"
Type="http://schemas.openxmlformats.org/officedocument/2006/relationships/settings"
Target="settings.xml" />
        <Relationship Id="rId7"
Type="http://schemas.openxmlformats.org/officedocument/2006/relationships/header"
Target="header1.xml" />
        <Relationship Id="rId2"
Type="http://schemas.openxmlformats.org/officedocument/2006/relationships/styles"
Target="styles.xml" />
        <Relationship Id="rId1"
Type="http://schemas.openxmlformats.org/officedocument/2006/relationships/numbering"
Target="numbering.xml" />
        <Relationship Id="rId6"
Type="http://schemas.openxmlformats.org/officedocument/2006/relationships/image"
Target="media/image1.jpeg" />
        <Relationship Id="rId9"
Type="http://schemas.openxmlformats.org/officedocument/2006/relationships/theme"
Target="theme/theme1.xml" />
        </Relationships>
``` found in the document. A macro-enabled file that uses VBA contains a binary part that stores the VBA project. Any word processor document that utilizes macros that are considered safe, such as XLM macros they may be saved as macro-enabled files. If a code-specific part is found in a macro-free file, whether placed there accidentally or maliciously, an application may be configured to not allow the code to execute.

Since any code that is associated with a document is stored as a modular part, developers can now determine if any code exists within a document before opening it. Previously this advance notice wasn't something that could be easily accomplished. Now the developer can inspect the container for the existence of any code-based parts and relationships without running the corresponding application and potentially risky code. If a file looks suspicious, a developer can remove any parts capable of executing code from the file.

Documents saved by using the open file format may be identified by their file extensions. According to one embodiment, the extensions borrow from existing binary file extensions by appending a letter to the end of the suffix. The default extensions for documents created in MICROSOFT WORD, EXCEL, and POWERPOINT using the open file format append the letter "x" to the file extension resulting in .docx, .xlsx, and .pptx, respectively. The file extensions may also indicate whether the file is macro-enabled versus those that are macro-free. Documents that are macro-enabled have a file extension that ends with the letter "m" instead of an "x." For example, a macro-enabled word processor document has a .docx extension, and thereby allows any users or software program, before a document opens, to immediately identify that it might contain code.

As discussed above, most parts of a document within a container can be manipulated using any standard XML processing techniques, or for the modular parts of the document that exist as embedded native formats, such as images, they may be processed using any appropriate tool for that object type. Once inside an open document, the structure makes it easy to navigate a document's parts and its relationships, whether it is to locate information, change content, or remove elements from a document. Having the use of XML, along with the published reference schemas, means a user can easily create new documents, add data to existing documents, or search for specific content in a body of documents.

The following are exemplary scenarios in which the open file format enables document-based solutions. These are only a few of an almost endless list of possibilities: Data Interoperability; Content Manipulation; Content Sharing and Reuse; Document Assembly; Document Security; Managing Sensitive Information; Document Styling; and Document Profiling. The openness of the open file format unlocks data and introduces a broad, new level of integration beyond the desktop. For example, developers may refer to the published specification of the new file format to create data-rich documents without using the application that created the document. Server-side applications may process documents in bulk to enable large-scale solutions that mesh enterprise data within a familiar application. Standard XML protocols, such as XPath (a common XML query language) and XSLT (Extensible Stylesheet Language Transformations), can be used to retrieve data from documents or to update the contents inside of a document from external data.

One such scenario could involve personalizing thousands of documents to distribute to customers. Information programmatically extracted from an enterprise database or customer relationship management (CRM) application could be inserted into a standard document template by a server application that uses XML. Creating these documents is highly efficient because there is no requirement that the creating programs need to be run; yet the capability still exists for producing high-quality, rich documents.

The use of custom schemas in one or more applications is another way documents can be leveraged to share data. Information that was once locked in a binary format is now easily accessible and therefore, documents can serve as openly exchangeable data sources. Custom schemas not only make insertion or extraction of data simple, but they also add structure to documents and are capable of enforcing data validation.

Editing the contents of existing documents is another valuable example where the open file format enhances a process. The edit may involve updating small amounts of data, swapping entire parts, removing parts, or adding new parts altogether. By using relationships and parts, the open file format makes content easy to find and manipulate. The use of XML and XML schema means common XML technologies, such as XPath and XSLT, can be used to edit data within document parts in virtually endless ways.

One scenario might involve the need to edit text within many word processor documents. For example, what if a company merged and needed to update their new company name in hundreds of different pieces of documentation? A developer could write code that loops through all the documents, locates the company name, and performs an XPath query to find the old text. Then new text may then be inserted and the process repeated until every document had been updated. Automation could save a lot of time, enable a process that might otherwise not be attempted, as well as prevent potential errors that might occur during a manual process.

Another scenario might be one in which an existing document must be updated by changing only an entire part. In a word processor document, an entire spreadsheet or chart that contained old data or outdated calculation models could be replaced with a new one by simply overwriting its part. This kind of updating also applies to binary parts. An existing image or even an OLE object could be swapped out for a new one, as necessary. A drawing embedded as an OLE object in a document, for instance, could be updated by overwriting that binary part. URLs in hyperlinks could be updated to point to new locations.

In order to optimize loading and saving performance and file size, a word processor application may store only one copy of repetitive text within the word processor file. The word processor application may implement a shared table. The shared table may be stored in a document part such as "fontTable.xml." Each unique font value found within a word processor document may then only be listed once in this part of the document. Individual document parts then reference the table to derive their values.

So while this process optimizes the word processor's XML file format, it also introduces some interesting opportunities for additional content manipulation solutions. Developers in a multinational organization could leverage a shared table to offer a level of multi-language support. Instead of building unique word processor documents for each language supported, a single word processor document could utilize tables that correspond to different languages. Another possibility would be to use tables to search for keyword terms inside a collection of word processor documents. Processing a single, text-only XML file of strings is faster and simpler than having to manipulate the word processor document object model over many word processor documents.

The modularity of the open file format opens up the possibility for generating content once and then repurposing it in a number of other documents. A number of core templates could be created and used as building blocks for other documents. One example scenario is building a repository of images used in documents. A developer can create a solution that extracts images out of a collection of documents and allow users to reuse them from a single access point. Since the documents may store the images in their native format, the solution could build and maintain a library of images without much difficulty. A developer could build a similar application that reuses document "thumbnail" images extracted from documents, and add a visual aspect to a document management process.

Many organizations have vast collections of files that have reusable value. Finding, coordinating, and integrating (copying and pasting) the content, however, is typically a time-consuming, redundant process that many organizations look to automate. As illustrated in FIG. 3, word processor document is a separate part that is readily accessible as it is self-contained in its own XML part within the container. A custom solution can leverage this architecture to automate the assembly process. Custom XML could be used to hold metadata pertaining to the individual word processor document, thus allowing users to easily search it by using predefined keywords.

Like so many other aspects of documents using the open file format, document styles, formatting, and fonts are maintained in separate XML parts within the container package. Some organizations have very specific document standards, and managing these can be quite consuming. However, developers can, for example, modify or replace fonts in documents without opening the associated application.

Also, it is a fairly common practice to have a document or collection of documents that contain the same content, but that have been formatted differently by another department, location, subsidiary, targeted customer, or such. Developers can maintain the content within a single set of documents, and then apply a new set of styles, as necessary. To do this, they would exchange the styles part of the document found in a document with another part. This ability to exchange simplifies the process of controlling a document's presentation without having to manage content in numerous documents.

Managing documents effectively has been a long-standing issue in information technology practices. In the open file format, document properties are also readily accessible as they reside in their own part within a document as follows:

```
<?xml version="1.0" encoding="UTF-8" standalone="yes"?>
<CoreProperties
xmlns="http://schemas.openxmlformats.org/package/2005/06/md/core-properties">
    <Title>Word Document Sample</Title>
    <Subject>Word Processor Document</Subject>
    <Creator>"A" User</Creator>
    <Keywords/>
    <Description>"open".docx file</Description>>
    <LastModifiedBy>"A" User</LastModifiedBy>
    <Revision>2</Revision>
    <DateCreated>2005-05-05T20:01:00Z</DateCreated>
    <DateModified>2005-05-05T20:02:00Z</DateModified>
</CoreProperties>
```

Organizations today cannot be confident that they will have access tomorrow to information locked in proprietary document formats, certainly if the program needed to properly display information in those documents is no longer available. Even for so-called "standards" based on proprietary page description languages (PDLs), the cumbersome presentation layer required by this information will make these formats difficult to sustain as an archival format.

Because the open file formats segment, store, and compress file components separately, they reduce the risk of corruption and improve the chances of recovering data from within damaged files. A cyclic redundancy check (CRC) error detection may be performed on each part within a document container to help ensure the part has not been corrupted. If one part has been corrupted, the remaining parts can still be used to open the remainder of the file. For example, a corrupt image or error in an embedded macro does not prevent users from opening the entire file, or from recovering the XML data and text-based information. Programs that utilize the open file format can easily deal with a missing or corrupt part by ignoring it and moving on to the next, so that any accessible data is salvaged. In addition, because the file formats are open and well documented, anyone can create tools for recovering parts that have been created improperly, for correcting XML parts that are not well formed, or for compensating when required elements are missing.

The open file format also addresses compatibility with both past file formats and future file formats that have not been anticipated. For example, a compatibility mode automatically restricts features and functionality that are unavailable in target versions help to ensure that users can exchange files seamlessly with other versions of an application or collaborate in mixed environments with no loss of fidelity or productivity.

Systems administrators may select the default file version type along with the default compatibility mode. Defaults can be set during installation or included in policies applied to specific users or specific roles. For example, organizations undertaking staged upgrades or staged rollouts might want to set a version 1 binary as the default "Save" option until all desktops have been upgraded.

The word processor document container 300 includes both user entered information as well as the feature and formatting information. Once the container 300 is opened and the desired file is accessed, there are a number of different ways to locate information. One way is by using an arbitrary schema for mapping data. A set of XML vocabularies defined within the schemas included herein fully define the features for the word processor document application.

Word processor documents, such as word processor document 310, may be created without ever launching the word processor application. For example, suppose that a customer of a Wall Street analyst company has access to information on certain companies. The customer accesses the analyst's website, logs on, and chooses to view the metrics for the evaluating a company in the automotive industry. The information returned could be streamed into a newly created word processor document that was never touched by the word processor application but which is now a word processor file, such that when the customer selects the file, the word processor application opens it up.

Storing too much information within the same modular part could potentially cause the performance of the word processor application to become very sluggish. According to one embodiment, common information is stored within its own part. Some examples include, common strings, functions, and name ranges.

The open file format is designed such that previous and future versions of an application may still work with a document. A future storage area is included within a part such that information that has not been thought of yet may be included within a document. In this way, a future version of the word processor application could access information within the future storage area, whereas a current version of the word processor application does not. The future storage area resides in the schema, and the schema allows any kind of content to be in there. In this way, previous versions of an application may still appear to work without corrupting the values for the future versions.

Many characters that may be used within a word processor application are not allowed in XML. If these characters are allowed to remain as it, the XML standard would be violated. Therefore, these special characters are encoded such that they may be saved out validly by XML (e.g. /X . . . or some kind of hex based encoding). When the encoded character is encountered it may be detected and loaded appropriately.

Figure 4A:
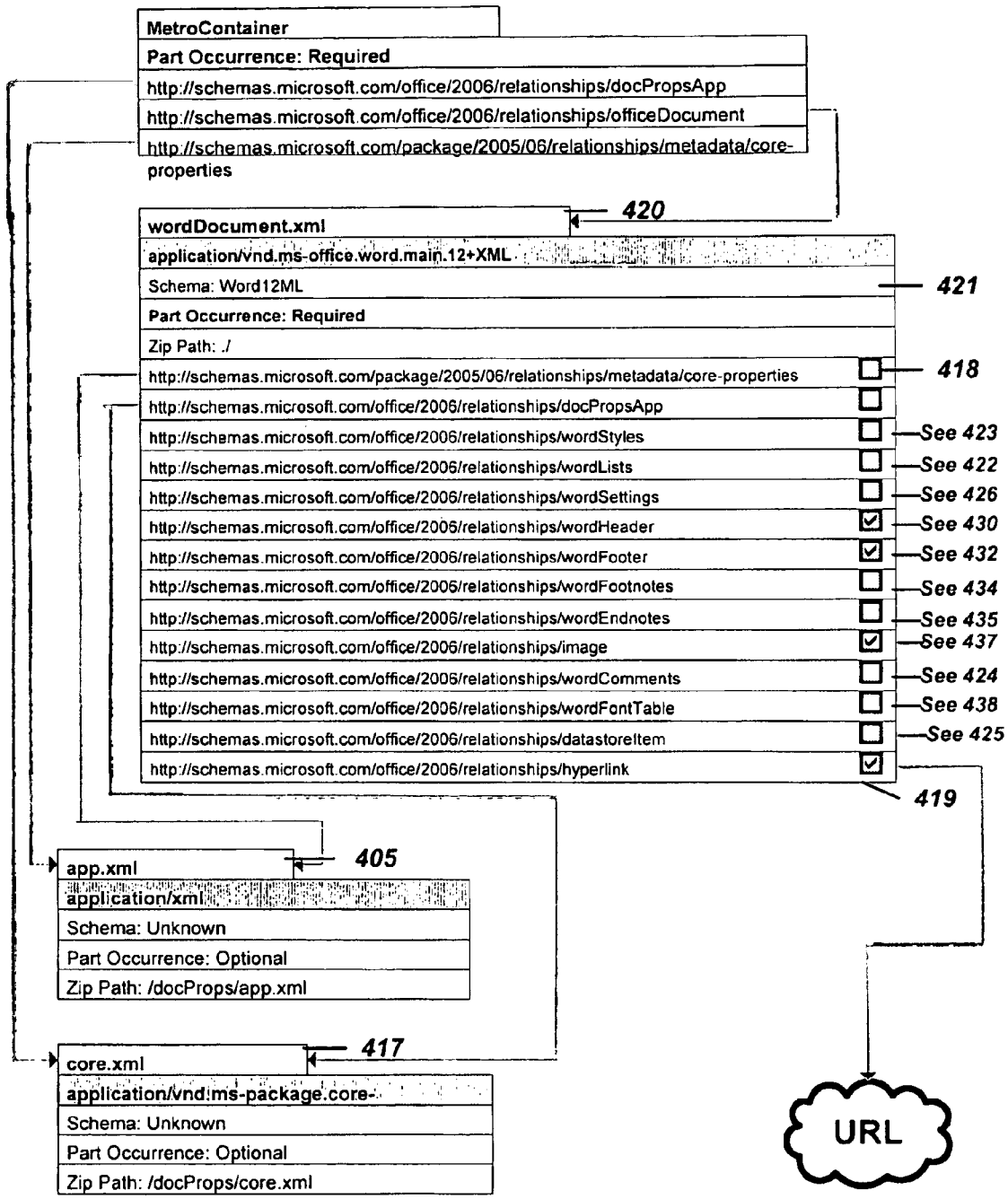

Referring now to FIGS. 4a-4c, block diagrams illustrating a document relationship hierarchy for various modular parts utilized in a file format 24 for representing a word processor document are shown. The document relationship hierarchy illustrates lists specific file format relationships some with a reference indicator 418 indicating a reference to that relationship in the content of the modular part, for example via a relationship identifier. The checkbox containers in the indicator indicate either that no explicit reference to relationship in content (not checked) or there is an explicit relationship in the content (checked). In some embodiments, it may not be enough to just have the relationship to the image part from a parent or referring modular part, for example from a document part. The parent part may also need to have an explicit reference to that image part relationship inline so that it is known where the image goes. Non-explicit indicators (checkboxes unchecked), indicate that a referring modular part is associated, but not called out directly in the parent part's content. An example of this may be a styles part, where it is implied that there is always a styles part associated, and therefore there is no need to call out the styles part in the content. All anyone needs to do to find the styles part is just look for a relationship of that type.

The various modular parts or components of the word processor document hierarchy are logically separate but are associated by one or more relationships. Each modular part is also associated with a relationship type and is capable of being interrogated separately and understood with or without the word processor application program 10 and/or with or without other modular parts being interrogated and/or understood. Thus, for example, it is easier to locate the contents of a document because instead of searching through all the binary records for document information, code can be written to easily inspect the relationships in a document and find the document parts effectively ignoring the other features and data in the open file format. Thus, the code is written to step through the document in a much simpler fashion than previous interrogation code. Therefore, an action such as removing all the code, personal information, and the like, while tedious in the past, is now less complicated.

A modular content framework may include a file format container associated with the modular parts. The modular parts include, the document part 420 operative as a guide for properties of the word processor document. The document hierarchy may also include a document properties part 417 containing built-in properties associated with the file format 24, a application part 405 containing core document properties associated with the file format 24, and a hyperlink part 419 facilitating a relationship with an external target part. It should be appreciated that each modular part is capable of being extracted from or copied from the document and reused in a different document along with associated modular parts identified by traversing relationships of the modular part reused. Associated modular parts are identified when the word processor application 10 traverses inbound and outbound relationships of the modular part reused.

Aside from the use of relationships in tying parts together, there is also a single part in every file that describes the content types for each modular part. This gives a predictable place to query to find out what type of content is inside the file. While the relationship type describes how the parent part will use the target part, the content or part type 421 describes what the actual modular part is (such as "XML") regarding content format. This assists both with finding content that is understood, as well as making it easier to quickly remove content that could be considered unwanted (for security reasons, etc.). The key to this is that the word processor application must enforce that the declared content types are indeed correct. If the declared content types are not correct and do not match the actual content type or format of the modular part, the word processor application should fail to open the modular part or file. Otherwise potentially malicious content could be opened. A comments part 420 may also be included.

Referring to FIG. 4b, other modular parts are illustrated that are associated with start part or word document part 420. The connections between the parts may be determined by locating the same reference number and/or title. As illustrated, FIG. 4b includes styles part 423, word lists part 422, settings part 426, comments part 424, and a data store item part 425 associated with an item properties part 427.

Referring to FIG. 4c, the modular parts also include a header part 430, a footer part 432, footnotes part 434, endnotes part 435, image part 437, and a fontTable part 438. According to one embodiment, the modular parts that are shared in more than one relationship are typically only written to memory once. Some modular parts may be global, and thus, can be used anywhere in the file format. In contrast, some modular parts are non-global and thus, can only be shared on a limited basis.

Figure 5:
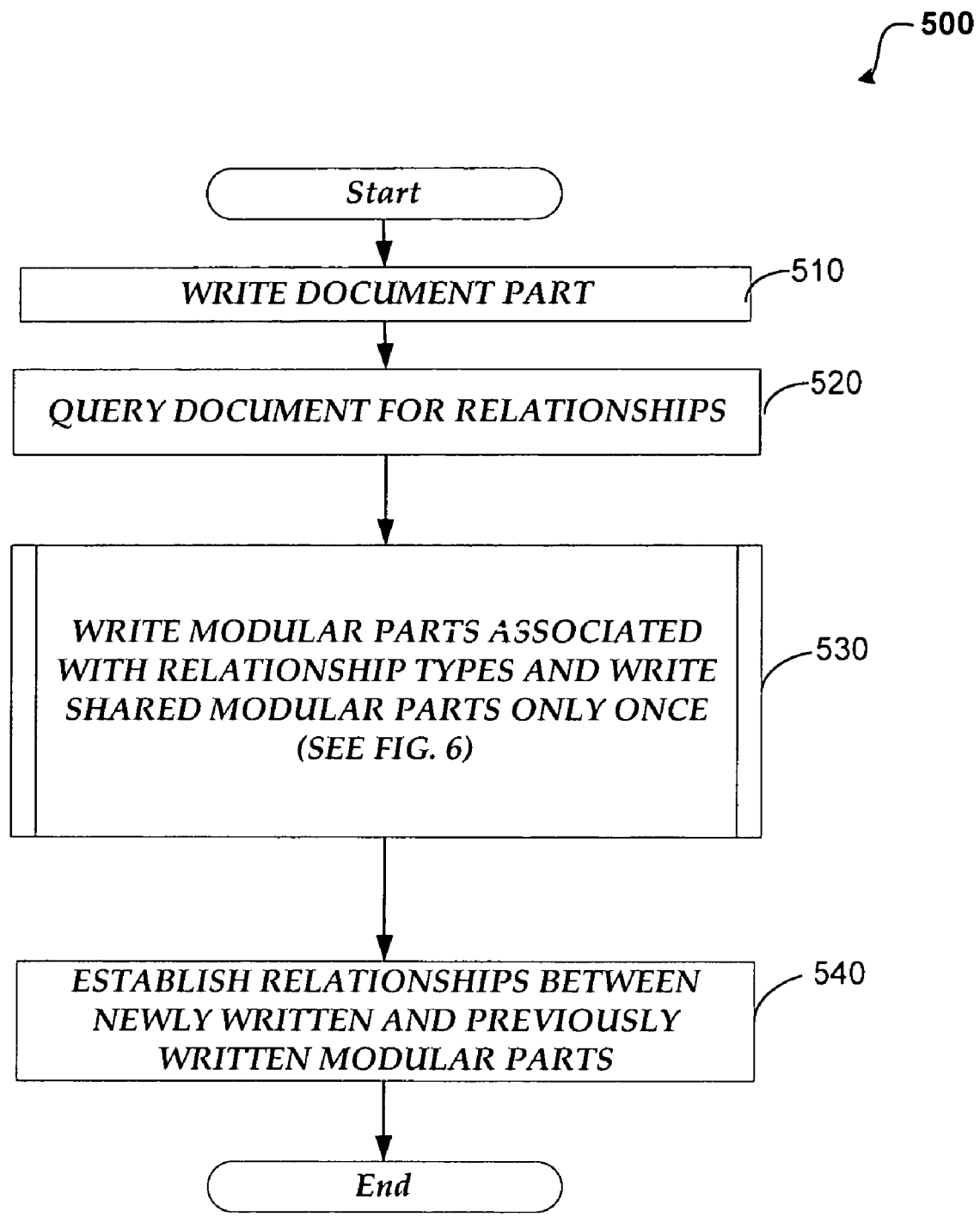
FIGS. 5-6 are illustrative routines performed in structuring data for word processing documents in a modular content framework, in accordance with aspects of the invention.
Figure 6:
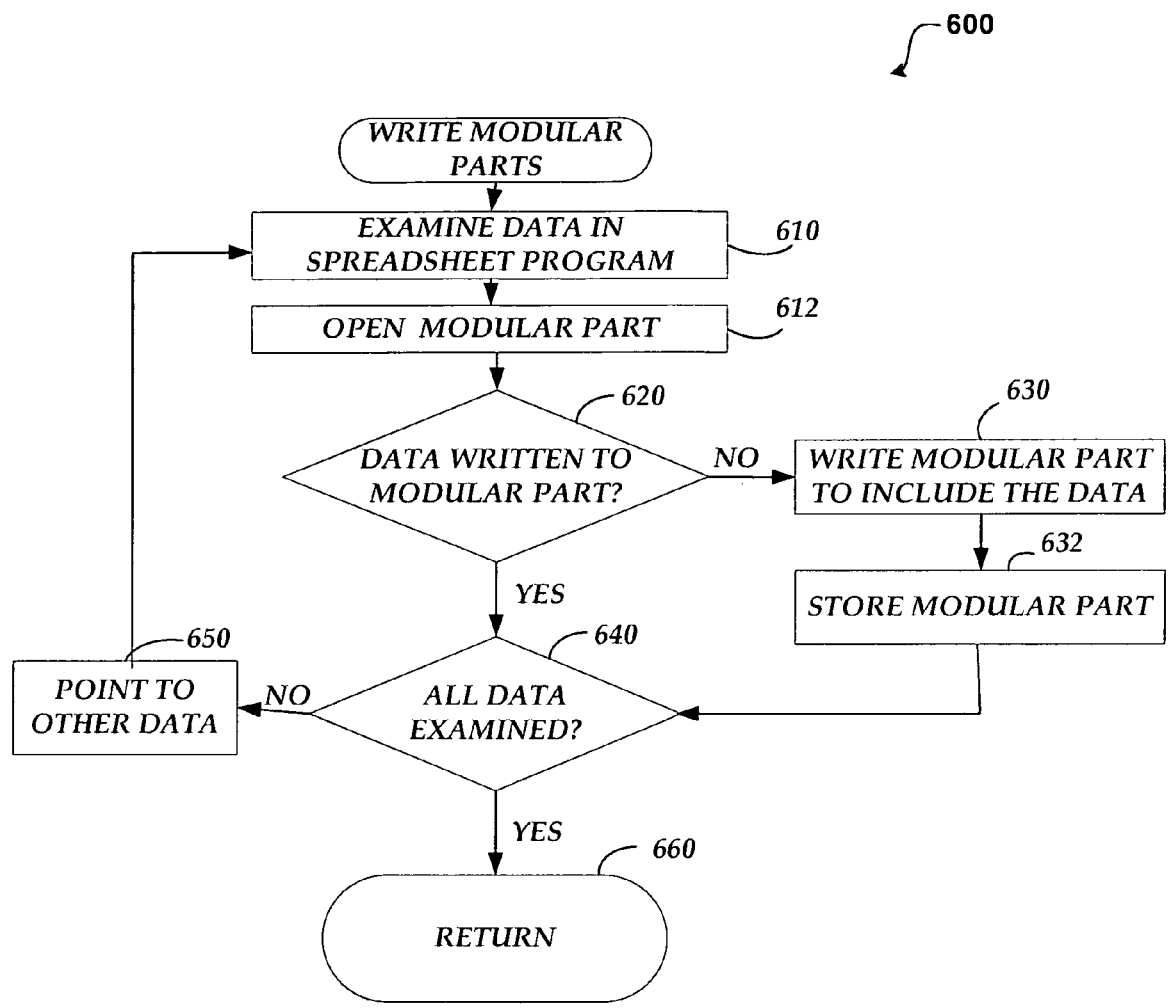

FIGS. 5-6 are illustrative routines performed in structuring and representing word processor documents in a modular content framework. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations illustrated making up the embodiments described herein are referred to variously as operations, structural devices, acts or modules. These operations, structural devices, acts and modules may be implemented in software, in firmware, in special purpose digital logic, and any combination thereof.

Referring now to FIG. 5, the routine 500 begins at operation 510, where an application program, such as a word processor application, writes a document part. The routine 500 continues from operation 510 to operation 520, where the application program queries the document for relationship types to be associated with modular parts logically separate from the document part but associated with the document part by one or more relationships. Next, at operation 530, the application writes modular parts of the file format separate from the document part. Writing modular parts may include opening and storing referenced modular parts. Additional details regarding writing modular parts are described below with respect to FIG. 6.

Each modular part is capable of being interrogated separately without other modular parts being interrogated and understood. According to one embodiment, any modular part to be shared between other modular parts is written only once. The routine 500 then continues to operation 540. At operation 540, the application 10 establishes relationships between newly written and previously written modular parts. The routine 500 then terminates at the end operation.

FIG. 6 illustrates a process for writing modular parts of a document. After a start operation, an application examines data in the word processor application. Next at operation 612, the application opens a referenced modular part. The routine 600 then continues to detect operation 620 where a determination is made as to whether the data has been written to the open modular part. When the data has not been written to a modular part, the routine 600 continues from detect operation 620 to operation 630 where the word processor application writes a modular part including the data examined. Next at operation 632, the application stores the modular part including the new data. The routine 600 then continues to detect operation 640 described below.

When at detect operation 620, the data examined has been written to a modular part, the routine 600 continues from detect operation 620 to detect operation 640. At detect operation 640 a determination is made as to whether all the data has been examined. If all the data has been examined, the routine 600 returns control to other operations at return operation 660. When there is still more data to examine, the routine 600 continues from detect operation 640 to operation 650 where the word processor application points to other data. The routine 600 then returns to operation 610 described above.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-readable storage medium having computer-executable instructions which, when executed by a computer, will cause the computer to perform a method of structuring a document that is associated with a word processing application utilizing an open file format, wherein the document is structured in a modular content framework implemented within the computer, the method comprising:
   logically separating modular parts in the document, wherein the modular parts include a document part for identifying relationships associated with the document, a document properties part for identifying relationships associated with the document, a document properties part operative as a guide for properties of the document, and a markup language part that includes information for the modular part;
   expressing one or more relationships among the modular parts, wherein each modular part is associated with a relationship type; and
   interrogating each of the modular parts separately without other modular parts being interrogated to facilitate locating the contents of the document, wherein each modular part is extracted from the document and reused in a different document along with associated modular parts identified by traversing inbound and outbound relationships of the modular part reused.

2. The computer-readable storage medium of claim 1, wherein the modular content framework includes a container that encloses the modular parts within a single file.

3. The computer-readable storage medium of claim 1, wherein the modular parts further include a personal information part that is removed for security reasons.

4. The computer-readable storage medium of claim 3, wherein the modular parts further include a data store item part containing customized data that is read into the document.

5. The computer-readable storage medium of claim 3, wherein the modular parts further include at least one of the following: a code part that includes code associated with the document; a font table part that includes common fonts; and a functions part that includes common functions.

6. The computer-readable storage medium of claim 3, wherein the functions part includes functions that are expressed as text and are associated with the document.

7. The computer-readable storage medium of claim 1, where the relationship types associated with the modular parts comprises at least one of a code file relationship identifying potentially harmful code files, a data item relationship, a hyperlink relationship, a comments relationship, an embedded object relationship, a personal information relationship; an image relationship, a document properties relationship, a header relationship, a footer relationship, a footnote relationship, an endnote relationship, or a styles relationship.

8. The computer-readable storage medium of claim 1, wherein the modular parts include a future storage area such that previous versions of an application and future versions of the application work without corrupting data.

9. The computer-readable storage medium of claim 8, wherein when content within a modular part is declared incorrectly, a word processor application is configured to fail to open the modular part.

10. A computer-implemented method for structuring a word processor document in a file format wherein modular parts associated with the word processor document include each part written into the file format, comprising:
    writing a word processor document part of the file format that is included within a word processor document;
    querying the word processor document for relationship types to be associated with modular parts logically separate from the word processor document part but associated with the word processor document part by one or more relationships;
    writing a second part of the file format separate from the word processor document part;
    establishing a relationship between the word processor document part and the second part; wherein the word processor part and the second part are interrogated individually;
    interrogating each of the parts separately to facilitate locating the contents of the word processor document; and
    extracting each part from the word processor document and reusing each part in a different document along with associated modular parts identified by traversing inbound and outbound relationships of the part reused.

11. The computer-implemented method of claim 10, further comprising:
    writing other modular parts associated with relationship types wherein the other modular parts that are to be shared are written only once; and establishing relationships to the other modular parts written.

12. The computer-implemented method of claim 11, wherein writing the other modular parts associated with the relationship types, comprises:
    examining data associated with the document;
    opening a modular part referenced when examining the data;
    determining whether the data examined has been written to a modular part;

writing and storing the modular part to include the data examined when the data examined has not been written to the modular part;

determining whether other data associated with the document has been examined; and examining the other data associated with the document in response to determining that the other data has not been examined.

13. The computer-implemented method of claim 12, further comprising stripping out code from the document before the modular part is written.

14. The computer-implemented method of claim 12, further comprising stripping out personal information from the document before the modular part is written.

15. The computer-implemented method of claim 12, further comprising validating the modular parts with an associated schema.

16. The computer-implemented method of claim 11, further comprising, writing a shared font table part that includes common fonts utilized within the word processor document part.

17. The computer-implemented method of claim 16, further comprising writing a functions part that includes common functions utilized within the word processor document part.

18. The computer-implemented method of claim 11, further comprising encapsulating the word processor document part and the second modular part within a container and storing the container as a single file.

19. A computer program product comprising a computer-readable storage medium having control logic stored therein for causing a computer to represent a word processor document in a file format comprising modular parts wherein the modular parts of the file format include each part written into the file format, the control logic comprising computer-readable program code for causing the computer to:

write a document part of the file format;

write a document properties part associated with the document part;

write a personal information part;

write a code part;

establish and write relationships between the parts;

interrogate each of the parts separately to facilitate locating the contents of the word processor document; and extract each part from the word processor document and reuse each part in a different document along with associated modular parts identified by traversing inbound and outbound relationships of the part reused.

* * * * *